INVENTOR
Laurie V. Kytola
BY
ATTORNEY

2,809,048

TRAILER FOR LOADING AND TRANSPORTING BOATS

Laurie V. Kytola, Nye, Wis.

Application June 22, 1955, Serial No. 517,275

3 Claims. (Cl. 280—44)

This invention relates to an improvement in boat trailers. More particularly the improvement resides in providing a light cantilever boat trailer which facilitates dry land loading, transporting and unloading of heavy boats.

The convenience with which a boat may be placed on a trailer coupled with its unloading and spring action on transportation is a factor to be considered relative to the cost of the structure. Of the several types of boat trailers known to be on the market, the most desirable are the most expensive and normally all known models require considerable bodily lifting of the boat to place it on a holding rack. Consequently there is needed a relatively inexpensive boat trailer which is light and sturdy providing springiness in transportation and yet provides for a minimum of lifting effort.

Accordingly it is an object of this improvement in boat trailers to provide a different trailer structure which facilitates loading and unloading of boats thereon.

Another object is to provide an improved boat trailer having a cantilever action in conjunction with the spring attachment of the boat carrying platform and axle.

A further object is to provide an improved boat loading structure in combination with a novel spring attachment and cantilever axle arrangement.

Further, objects and advantages will be presented from the following description of the accompanying drawing, wherein.

With reference to the drawings like parts will be similarly indicated.

Figure 1:
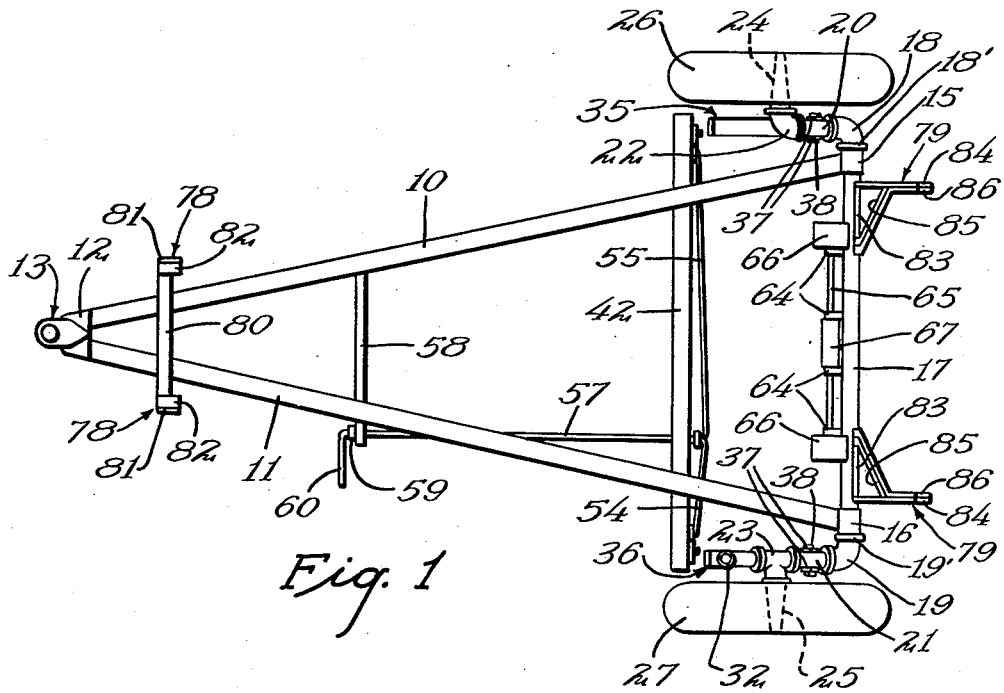
Figure 1 is a top plan view of my improved boat trailer.

The improved and simplified trailer structure embodied in the present disclosure is constructed of a pair of tubular extensions 10 and 11 meeting at one end to form a V-shaped frame support provided with a welded-on connecting bar 12 which mounts a conventional trailer hitch connection 13. The spread ends of the tubular extensions 10 and 11 are provided with welded-on rings 15 and 16, respectively, through which a tubular axle 17 extends and is pivoted therein. Welded onto the ends of the axle 17 are tubular elbow bends 18 and 19 to which are welded a pair of short straight tubular connections 20 and 21 serving as mountings for the axle holding elbow 22 and the axle holding T-connection 23 serving in turn as mountings for the conventional wheel axles 24 and 25, respectively. The wheel axles 24 and 25 serve to mount the wheels 26 and 27, respectively, by conventional bearings and mountings of the usual character.

In order to provide the cantilever action for lifting axle 17 a hollow tubular connection 30 is welded on to the one end of the T 23 and is bent upwardly at 31 to provide a socket 32 for the end of a lever arm or shaft 33. Bearing down on the end of a lever handle (not shown) lifts the axle 17 and any load which is contained thereon.

The flanges 18' and 19' on elbows 18 and 19, respectively, serve to brace the pivotal ring ends 15 and 16 of the tubular frame shafts 10 and 11, respectively.

Figure 2:
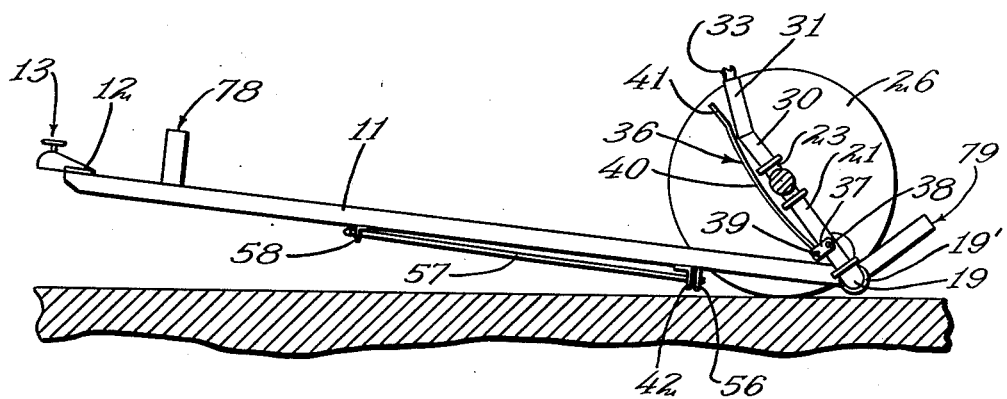
Figure 2 is a side plan view of the boat trailer shown in Figure 1.
Figure 3:
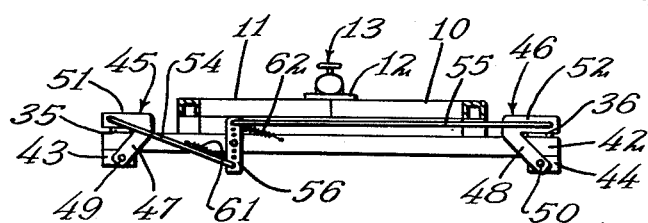
Figure 3 is a cross-sectional view showing details of the trailer springs in locked position by locking and unlocking structure.

In order to provide for a smooth riding action in combination with the light framework above described there is suspended under the frame pieces 20 and 21 a pair of light spring leaves 35 and 36. As illustrated in Figure 2 taken in conjunction with Figure 1 pairs of spring clips 37 are fastened by bolts 38 to the sides of the frame pieces 20 and 21. The suspending ends of the clips 37 are provided with a pair of spring mounting bolts 39 extending through looped ends of the spring leaves 35 and 36. The spring leaves as indicated in Figure 2 are bowed slightly through their center section 40 and flattened at the free ends 41. The flattened free ends 41 are normally locked on the cross bar 42, in the manner as shown in Figure 3, when the frame is in a lifted position. The bar 42 is an L-angled bar having one side welded to the frame members 10 and 11 with the depending flange side provided at its ends with extensions 43 and 44. Mounted on the extensions 43 and 44 are a pair of angular pivotal hooks 45 and 46 having their legs 47 and 48 secured at pivot points 49 and 50, respectively. The spring hooking or fastening ends 51 and 52 engage over the springs 35 and 36, respectively, to hold them against bar 42 and the trailer frame in a raised position. In order to pivot the hooks 45 and 46 there is hooked into suitable apertures at the fastening ends 51 and 52 a pair of pivotal tie rods 54 and 55 having their opposite ends pivotally secured or hooked in suitable apertures in the opposite ends of a pivotal plate 56. This pivotal plate 56 is supported by the bar 42 by being welded to or otherwise secured on a turn rod 57 which extends through a suitable aperture in the bar 42. The outside or other end of the tie rod 57 extends through a suitable hole or aperture in brace bar 58 welded to the underside of the frame pieces 10 and 11. A collar 59 holds the tie rod 57 and plate 56 in position and offsets the handle 60, on tie rod 57, from the brace 58 and frame member 11, to provide room for manipulation and turning. A pair of tension springs 61 and 62 having their respective ends fastened in suitable apertures in the bar 42 and at the ends of plate 56 to normally pull against the unlocking of hooks 45 and 46. The tension springs 61 and 62 normally keep the plate 56 from rotating and the hooks 45 and 46 in a locking position holding the leaf springs 35 and 36 locked against bar 42 and the trailer frame lifted in boat transporting position.

In order to avoid lifting the bulk body of a boat which is to be mounted upon the trailer, there is welded to the axle shaft 17 a series of brackets or lugs 64 through which extends, in suitable apertures therethrough, a rod 65 upon which is mounted and secured by conventional nuts or washer and cotter keys, a pair of rotatable end pulleys 66 and an intermediate rotatable pulley 67. The intermediate pulley 67 is of lesser diameter than pulleys 66 to provide for the normal bulge of the keel. Illustratively, the boat carrier is of a length suitable for carrying a 14 foot size boat. This boat size is not ordinarily easily lifted by one person and loaded onto a trailer. However, with the present structure the trailer is easily backed under the prow of the boat as the normal contour of the boat bottom raises the nose of the boat a few inches off the ground. Then pulling on the boat causes the bottom to ride over the rollers 66 and 67. A slight lifting and pulling of the front end of the boat will roll it onto the trailer frame to the point where it comes to rest in a balanced position between the front upright spaced boat holding braces 78 and the sides at the back end of the boat rest against boat holding braces 79.

The braces 78 are formed of a flat metal bar 80 welded across the frame members 10 and 11 and having its ends 81 turned up at right angles to the welded base and faced or coated with paddings, for example, glued on felt bodies 82. The braces 79 are somewhat more sturdily constructed and mounted as the bulk of the weight of the boat occasionally rides thereagainst during transportation. This structure comprises base bars 83 welded to the axle shaft 17 with side uprights 84 welded to the bars 83. Diagonal brace bars 85 are welded between the uprights 84 and the opposite ends of base bars 83 to strengthen the braces 79 and also form a support for the bottom contour of a boat. Paddings 86 of felt or the like are glued or otherwise secured to the boat facing sides of the braces 79.

In constructing a trailer as herein described it has been found that comparatively inexpensive tubular one and three quarter inch plumber's piping with fitted threaded ends and elbows with other pipe coupling connectors can be used to make the trailer frame a comparatively inexpensive structure.

In accordance with the patent statutes, I have described the principles of construction and operation of my boat trailer, and while I have endeavored to set forth the best embodiment thereof, I desire to have it understood that obvious changes may be made within the scope of the following claims without departing from the spirit of my invention.

I claim:

1. A boat trailer structure comprising in combination a tubular frame structure having a forward end and rearwardly spaced ends, a cantilever axle mounting between a pair of wheels, said rearward spaced ends of said frame being rotatably mounted on said axle, rollers mounted on said axle mounting for rotating under the bottom of a boat as it is loaded on said frame structure over said cantilever axle, a pair of spring leaf means fastened at their one end to said cantilever axle and having their other ends free of permanent attachment, a bar across said frame against which the said free ends of said spring leaf means are adapted to rest, a pair of lever operable releasable locking means for holding said free end of said pair of spring leaf means temporarily on said bar and the cantilever axle in an erected position, and a lever handle connected to said locking means extending forwardly and supported by the said forward end of said frame.

2. A boat trailer including a frame structure pivotally attached to a cantilever axle shaft having a pair of wheels at the ends thereof provided with an improved releasable spring leaf means comprising a pair of spring leaves secured at their one end to said axle and having their opposite end free of permanent attachment, a cross bar on said frame structure against which the free ends of said spring leaves are adapted to ride when the said frame and axle are in erected position, a pair of locking hooks for securing said free ends of said spring leaves against said bar, rod means connected to the ends of said hooks, a pivotal plate connected to the ends of said rod means, a handle rod for pivoting said plate and moving said hooks to unlock said leaf ends, and spring means normally holding said hooks in locking position over said free ends of said spring leaves when the trailer frame and the cantilever axle are in erected position.

3. The structure of claim 2, wherein the frame structure and said axle are provided with spaced upright braces for supporting a boat on said frame and said axle is provided with roller means for turning under the bottom of a boat in a loading operation.

References Cited in the file of this patent

UNITED STATES PATENTS

| | | |
|---|---|---|
| 2,610,865 | Cantrell | Sept. 16, 1952 |
| 2,650,730 | Rohm | Sept. 1, 1953 |